US008896226B2

(12) United States Patent
Lin

(10) Patent No.: US 8,896,226 B2
(45) Date of Patent: Nov. 25, 2014

(54) CONSTANT-POWER POWER SUPPLY APPARATUS AND METHOD OF SUPPLYING CONSTANT-POWER POWER

(71) Applicants: Hep Tech Co., Ltd., Taichung (TW); Ming-Feng Lin, Taichung (TW)

(72) Inventor: Ming-Feng Lin, Taichung (TW)

(73) Assignees: Hep Tech Co., Ltd., Taichung (TW); Ming-Feng Lin, Taichung (TW)

( * ) Notice: Subject to any disclaimer, the term of this patent is extended or adjusted under 35 U.S.C. 154(b) by 0 days.

(21) Appl. No.: 14/165,182

(22) Filed: Jan. 27, 2014

(65) Prior Publication Data
US 2014/0225525 A1    Aug. 14, 2014

(30) Foreign Application Priority Data

Feb. 8, 2013   (TW) .............................. 102105249 A
Feb. 8, 2013   (TW) .............................. 102203042 U

(51) Int. Cl.
*H05B 37/02*    (2006.01)
*H02M 3/04*     (2006.01)
*H05B 33/08*    (2006.01)

(52) U.S. Cl.
CPC ............. *H02M 3/04* (2013.01); *H05B 33/0845* (2013.01); *H05B 33/08* (2013.01)
USPC ............ 315/224; 315/291; 315/307; 315/294

(58) Field of Classification Search
CPC .. H05B 41/3925; H05B 37/02; H05B 37/029; H05B 33/0815; H05B 33/0845; H05B 33/0851; H02M 3/04
USPC ......... 315/247, 291, 294, 224, 307, 308, 302, 315/312; 323/234, 246
See application file for complete search history.

(56) References Cited

U.S. PATENT DOCUMENTS

| 8,350,497 B2 * | 1/2013 | Peting et al. ................... 315/291 |
| 8,564,222 B2 * | 10/2013 | Chiang ........................... 315/294 |
| 8,653,752 B2 * | 2/2014 | Sakuragi et al. .............. 315/299 |

* cited by examiner

*Primary Examiner* — Haiss Philogene
(74) *Attorney, Agent, or Firm* — Ming Chow; Sinorica, LLC

(57) ABSTRACT

A power supply apparatus for applying a method of supplying a loading with an electric power within a predetermined range of a default power, which includes a driving unit, a voltage sensing unit, and a feedback control unit. The driving unit receives power from a power source, and supplies the loading with a working voltage and a working current; the voltage sensing unit detects the working voltage; the feedback control unit keeps a plurality of reference voltages, wherein each two neighboring reference voltages are defined to have a voltage section therebetween. The feedback control unit sends a current signal to the driving unit according to the working voltage and a slope parameter of the voltage section which the working voltage falls in, and the driving unit supplies the working current according to the current signal to maintain the electric power in the predetermined range of the default power.

16 Claims, 4 Drawing Sheets

CONSTANT-POWER POWER SUPPLY APPARATUS AND METHOD OF SUPPLYING CONSTANT-POWER POWER

The current application claims foreign priorities to the patent applications of Taiwan No. 102105249 filed on Feb. 8, 2013 and No. 102203042 filed on Feb. 8, 2013.

BACKGROUND OF THE INVENTION

1. Technical Field

The present invention relates generally to an apparatus of driving loading, and more particularly to a constant-power power supply apparatus and a method of supplying constant-power power.

2. Description of Related Art

Typically, a constant-power power supply apparatus is used to supplies a specific loading, such as LED (light emitting diode) chip or rechargeable battery, with a constant-power electric power. The conventional constant-power power supply apparatus provides a constant working voltage and a constant working current to the loading only, so that the devices driven by different working voltages and/or working currents need the constant-power power supply apparatus with different specs. For LED chips with the same power, there are a variety of combinations of working voltages and working currents for such LED chips in the present market. For example, the working voltages and working currents for 28 W LED chips includes 80V/350 mA, 56V/500 mA, and 40V/700 mA, and each LED chip needs a specific constant-power power supply apparatus. Therefore, for a manufacturer of LED chips, he has to make a variety of LED chips as well as a variety of constant-power power supply apparatus so that the conventional LED chips are very expensive. In conclusion, the conventional constant-power power supply apparatus still needs to be improved.

BRIEF SUMMARY OF THE INVENTION

In view of the above, the primary objective of the present invention is to provide a constant-power power supply apparatus and a method of supplying constant-power power, which is controllable to provide different voltages and currents under a constant power.

The present invention provides a method of supplying a loading with an electric power within a predetermined range of a default power, wherein at least two reference voltages are predetermined, and each two neighboring reference voltages are defined to have a voltage section therebetween, and each voltage section has a slope parameter accordingly; the method includes the steps of: detecting a working voltage of the electric power supplied to the loading; obtaining the slope parameter of the voltage section in which the working voltage falls; and generating a working current according to the working voltage and the obtained slope parameter, wherein a product of the working current and the working voltage is in the predetermined range of the default power.

The present invention further provides a power supply apparatus for receiving power from a power source and supplying a loading with an electric power within a predetermined range of a default power, includes a driving unit, a voltage sensing unit, and a feedback control unit, wherein the driving unit is for receiving the power from the power source and supplying the loading with a working voltage and a working current; the voltage sensing unit is electrically connected to the driving unit to detect the working voltage; the feedback control unit is electrically connected to the voltage sensing unit and the driving unit, wherein the feedback control unit keeps at least two reference voltages, and each two neighboring reference voltages are defined to have a voltage section therebetween, and each voltage section has a slope parameter accordingly; wherein the feedback control unit receives the working voltage sensed by the voltage sensing unit, and finds the voltage section in which the working voltage falls to obtain the slope parameter of the voltage section, and then sends a current signal, which is according to the working voltage and the obtained slope parameter, to the driving unit to command the driving unit to change the working current accordingly, wherein a product of the working current and the working voltage is remained in the predetermined range of the default power.

Whereby, the aforementioned apparatus and method could be applied for loadings which require the same power but different working voltage and/or working current, since the power provided is remained in the predetermined range of the default power. Therefore, the inconvenience of the conventional constant-power power supply apparatus that it could be only compatible with single working voltage and single working current is effectively improved.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
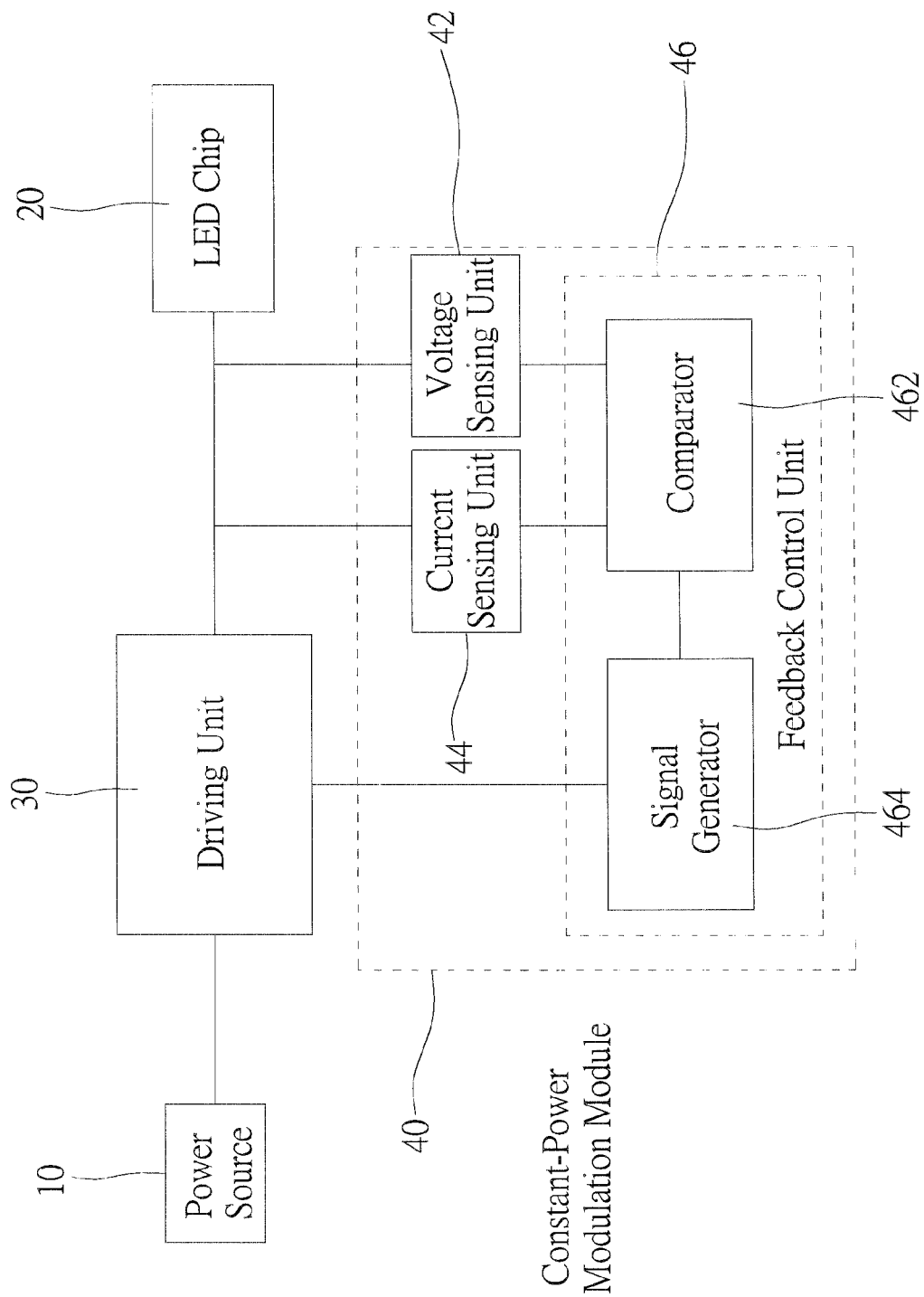
FIG. 1 is a block diagram of the constant-power power supply apparatus of a preferred embodiment of the present invention, which is applied in a LED illumination system.

FIG. 1 shows an illumination system with a constant-power power supply apparatus of a preferred embodiment of the present invention. The constant-power power supply apparatus is respectively connected to a power source 10 and a loading, which is a LED chip 20 in the preferred embodiment. The constant-power power supply apparatus includes a driving unit 30 and a constant-power modulation module 40.

The driving unit 30 is electrically connected to the power source 10 and the LED chip 20 respectively to receive power from the power source 10 and supply a working voltage and a working current to the LED chip 20. The driving unit 30 is controllable to change a value of the working voltage and a value of the working current. In practice, the driving unit 30 could be designed based on PWM circuit, half-bridge circuit, or buck boost circuit.

The constant-power modulation module 40 has a voltage sensing unit 42, a current sensing unit 44, and a feedback control unit 46.

The voltage sensing unit 42 and the current sensing unit 44 are electrically connected to the driving unit 30 to detect the value of the working voltage and the working current supplied to the LED chip 20 respectively.

Figure 2A:
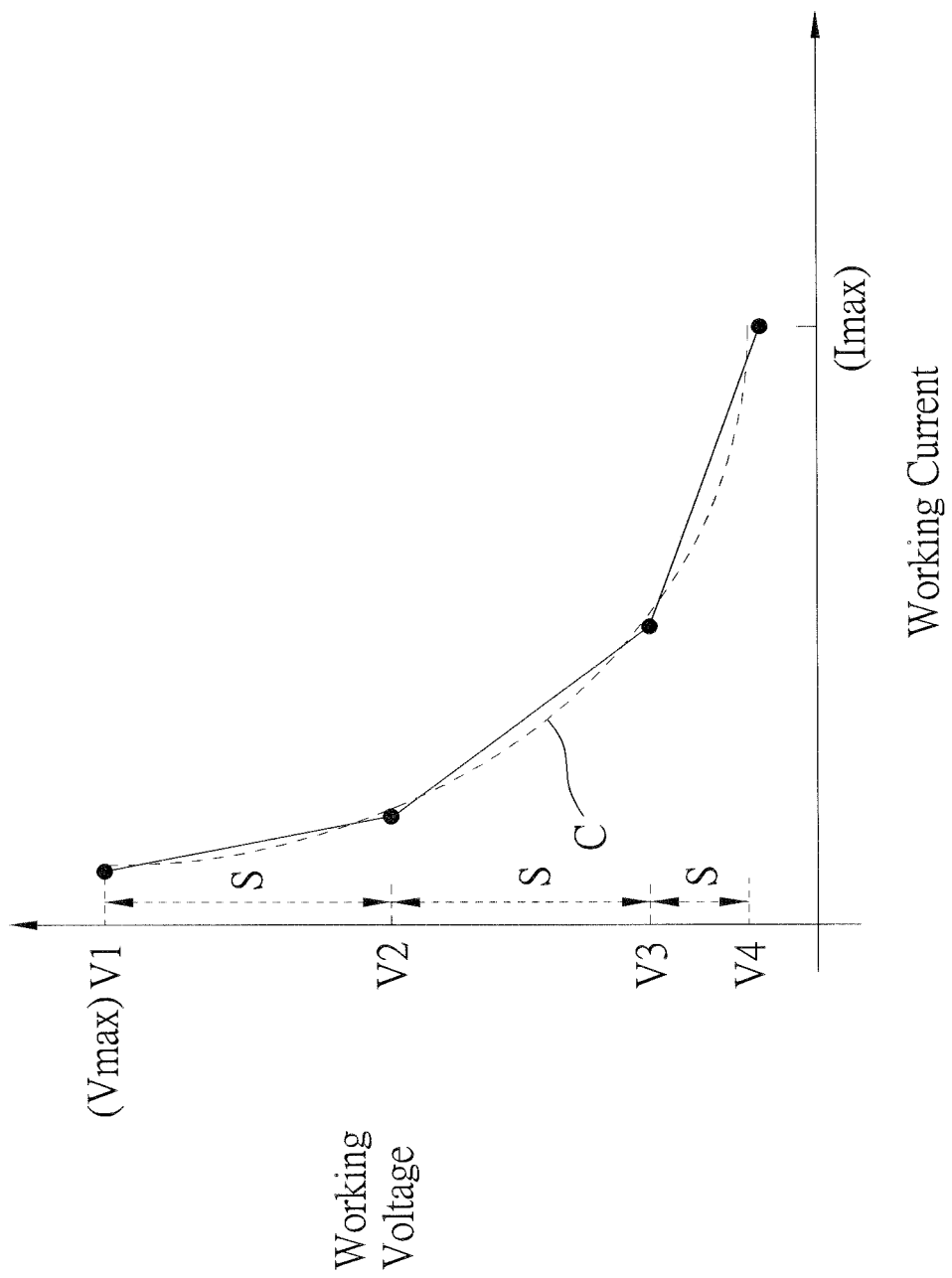
FIG. 2A is a diagram of the preferred embodiment of the present invention, showing the relation of the working voltage and the working current.
Figure 2B:
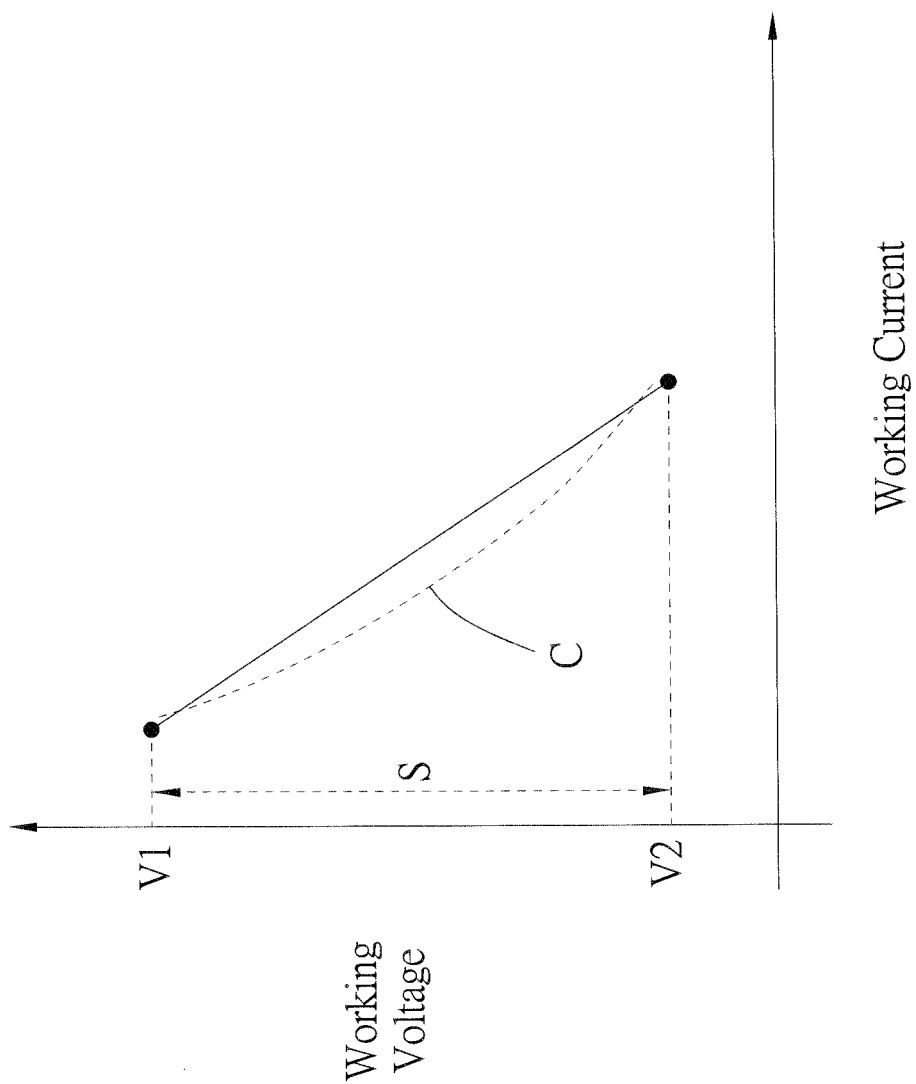
FIG. 2B is an enlarged view of FIG. 2A, showing the voltage section between two neighboring reference voltages.

The feedback control unit 46 has a comparator 462 and a signal generator 464. The comparator 462 is electrically connected to the voltage sensing unit 42, and the signal generator 464 is electrically connected to the driving unit 30. In the present embodiment, as shown in FIG. 2A and FIG. 2B, the comparator 462 keeps four reference voltages V1, V2, V3, and V4, each of which has a reference current corresponding to a value of the working current. Each two neighboring reference voltages are defined to have a voltage section S therebetween, and there is a straight line defined in each voltage section S to connect two corresponding reference voltages. The straight lines approach the real relation curve C of the ideal working voltages versus ideal working currents, wherein at any point on the relation curve C, a product of the working voltage and the working current is the same, and the product is a default power. The highest reference voltage V1 is defined as an upper limit voltage Vmax, the lowest reference voltage V4 is a lower limit voltage Vmin, and the corresponding reference currents are upper limit current Imax and lower limit current Imax respectively. Each straight light has a slope, wherein absolute values the slopes of the straight lines decrease from the voltage section S between the reference voltages V1 and V2 to the voltage section S between the reference voltages V3 and V4. In other words, the absolute value of the slope of the straight line in the voltage section S between the reference voltages V1 and V2 is the highest, and the absolute value of the slope of the straight line in the voltage section S between the reference voltages V3 and V4 is the lowest. The comparator 462 keeps slope parameters corresponding to each slope of each straight line in each voltage sections S respectively. In this way, the comparator 462 sends out a slope signal according to the slope parameters.

The signal generator 464 receives the slope signal, and then generates a current signal according to the received slope signal and the working voltage. The driving unit 30 receives the current signal to change the current supplied to the LED chip 20 accordingly.

The comparator 462 further generates a voltage limitation signal and a current limitation signal. The signal generator 464 receives these two signals to command the driving unit 30 to limit the working voltage and the working current supplied to the LED chip 20 no higher than a predetermined voltage and current to protect the LED chip 20 from being burned by high voltage or high current.

Figure 3:
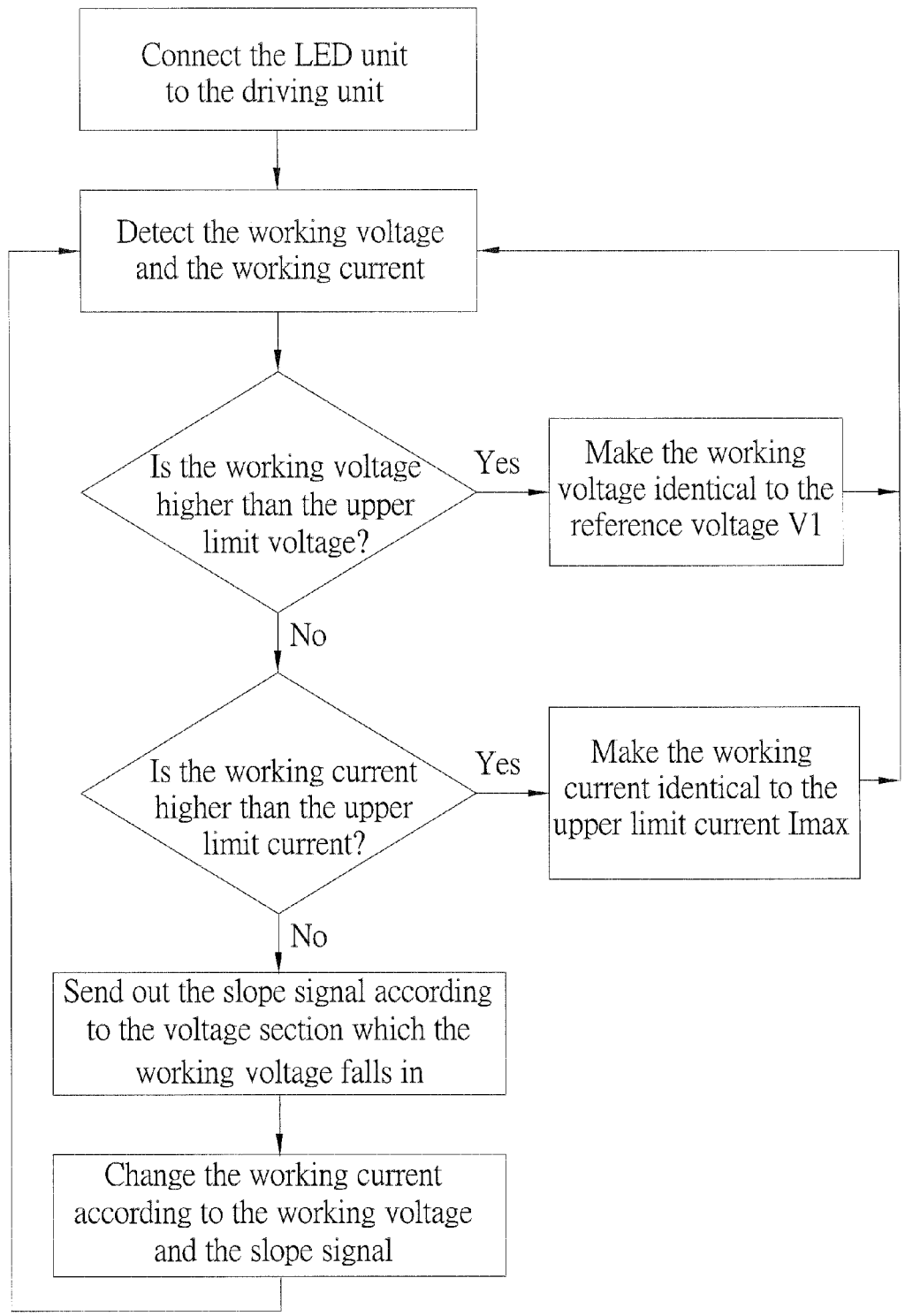
FIG. 3 is a flow chart of the method of the preferred embodiment of the present invention.

The present invention further provides a method of supplying a constant-power power, as shown in FIG. 3, and the method includes the following steps:

A. Connect the LED chip 20, which requires a power the same as the default power, to the driving unit 30.

B. Detect the working voltage by the voltage sensing unit 42, and detect the working current by the current sensing unit 44.

C. Compare the working voltage with the upper limit voltage Vmax, and then send the voltage limitation signal to the signal generator 464 if the working voltage is higher than the upper limit voltage Vmax or go to the step D otherwise. When the working voltage is higher than the upper limit voltage Vmax, the signal generator 464 generates an upper limit voltage signal, and send it to the driving unit 30 to make the working voltage supplied to the LED chip 20 identical to the reference voltage V1, and then go back to the step B.

D. Compare the working current with the upper limit current by the comparator 462, and then send the current limitation signal to the signal generator 464 if the working current is higher than the upper limit current Imax or go to the step E otherwise. When the working current is higher than the upper limit current Imax, the signal generator 464 generates an upper limit current signal, and send it to the driving unit 30 to make the working current supplied to the LED chip 20 identical to the upper limit current Imax, and then go back to the step B.

E. Determine which voltage section S the detected working voltage falls in, and obtain the slope parameter of the voltage section S and generate the slope signal accordingly. The signal generator 464 generates the current signal according to the working voltage and the slope signal to command the driving unit 30 to supply the LED chip 20 with a predetermined current. The power (the product of the working voltage and the working current) of the electric power supplied to the LED chip 20 is within a predetermined range of the default power. The present invention provides a plurality of the voltage sections, and obtains a slope of a straight line, which approaches the ideal relation curve for constant power, in each voltage section to get the corresponding working current by the detected working voltage and the slope of the voltage section which the working voltage falls in. Preferable, the predetermined range of the default power is in a range between 90% and 110% of the default power (i.e., the default power ±10%). For example, if the default power is 28 W, the predetermined range will be between 25.2 W and 30.8 W.

F. Repeat the steps from the step B to the step E to keep supplying the LED chip 20 with an electric power of constant power.

Therefore, the present invention is applicable for the LED chips with the same working voltage and working current, and also for the LED chips with different working voltage and/or working current. As a result, one of the power supply apparatus of the present invention could be incorporated in different LED chips.

Except for LED chips 20, the power supply apparatus of the present invention could be applied to other electric or electronic devices, such as rechargeable batteries, which need a constant-power electric power as well.

The present invention defines several voltage sections, and approaches the ideal constant-power curve by connecting the straight lines in each voltage section. If the working voltage of the loading changes, which means it shifts to another voltage section, the present invention would still get the corresponding current to supply the electric power within the predetermined range of the default power. It is easy to understand that if number of the voltage sections increases, the connected straight lines from each voltage sections will be closer to the ideal constant-power curve.

It must be pointed out that the embodiments described above are only some preferred embodiments of the present invention. All equivalent structures and methods which employ the concepts disclosed in this specification and the appended claims should fall within the scope of the present invention.

What is claimed is:

1. A method of supplying a loading with an electric power within a predetermined range of a default power, wherein at least two reference voltages are predetermined, and each two neighboring reference voltages are defined to have a voltage section therebetween, and each voltage section has a slope parameter accordingly; the method comprising the steps of:

detecting a working voltage of the electric power supplied to the loading;

obtaining the slope parameter of the voltage section in which the working voltage falls; and generating a working current according to the working voltage and the obtained slope parameter, wherein a product of the working current and the working voltage is in the predetermined range of the default power.

2. The method of claim 1, further comprising the step of comparing the working voltage with an upper limit voltage, and keeping the working voltage supplied to the loading identical to the highest reference voltage when the working voltage is higher than the upper limit voltage.

3. The method of claim 1, wherein the working current supplied to the loading is kept no higher than an upper limit current.

4. The method of claim 2, wherein the working current supplied to the loading is kept no higher than an upper limit current.

5. The method of claim 1, wherein the predetermined range of the default power is between 90% and 110% of the default power.

6. The method of claim 1, wherein number of the reference voltages is at least three.

7. The method of claim 6, wherein absolute values of the slope parameters of the voltage sections decrease from the voltage section between the highest and the second highest reference voltages to the voltage section between the second lowest and the lowest reference voltages.

8. The method of claim 1, wherein the loading has a LED chip.

9. A power supply apparatus for receiving power from a power source and supplying a loading with an electric power within a predetermined range of a default power, comprising:
   a driving unit for receiving the power from the power source and supplying the loading with a working voltage and a working current;
   a voltage sensing unit electrically connected to the driving unit to detect the working voltage; and
   a feedback control unit electrically connected to the voltage sensing unit and the driving unit, wherein the feedback control unit keeps at least two reference voltages, and each two neighboring reference voltages are defined to have a voltage section therebetween, and each voltage section has a slope parameter accordingly;
   wherein the feedback control unit receives the working voltage sensed by the voltage sensing unit, and finds the voltage section in which the working voltage falls to obtain the slope parameter of the voltage section, and then sends a current signal, which is according to the working voltage and the obtained slope parameter, to the driving unit to command the driving unit to change the working current accordingly, wherein a product of the working current and the working voltage is remained in the predetermined range of the default power.

10. The power supply apparatus of claim 9, wherein the feedback control unit further keeps an upper limit voltage; the feedback control unit sends a voltage signal to the driving unit to keep the working voltage supplied to the loading identical to the highest reference voltage when the working voltage is higher than the upper limit voltage.

11. The power supply apparatus of claim 10, further comprising a current sensing unit electrically connected to the driving unit and the feedback control unit to detect the working current, wherein the feedback control unit further keeps an upper limit current, and the feedback control unit sends a current signal to the driving unit when the working current is higher than an upper limit current, to keep the working current supplied to the loading identical to the upper limit current.

12. The power supply apparatus of claim 9, wherein the feedback control unit has a comparator and a signal generator; the comparator is electrically connected to the voltage sensing unit, and the signal generator is electrically connected to the driving unit; the comparator keeps the reference voltages and the slope parameters; the comparator determines which voltage section the working voltage falls in, and then sends a slope signal according to the slope parameter of the voltage section to the signal generator; the signal generator generates the current signal according to the slope signal and the working voltage.

13. The power supply apparatus of claim 9, wherein the predetermined range of the default power is between 90% and 110% of the default power.

14. The power supply apparatus as defined in claim 9, wherein number of the reference voltages is at least three.

15. The power supply apparatus as defined in claim 14, wherein absolute values of the slope parameters of the voltage sections decrease from the voltage section between the highest and the second highest reference voltages to the voltage section between the second lowest and the lowest reference voltages.

16. The power supply apparatus as defined in claim 9, wherein the loading has a LED chip.

* * * * *